United States Patent [19]

Klüver et al.

[11] Patent Number: 4,969,997

[45] Date of Patent: Nov. 13, 1990

[54] FLUID-IMPERMEABLE AREAS ON POROUS MEMBRANE FILTERS AND THEIR APPLICATION

[75] Inventors: Horst Klüver, Dransfeld; Dietmar Nussbaumer; Eberhard Wünn, both of Göttingen, all of Fed. Rep. of Germany

[73] Assignee: Sartorius GmbH, Fed. Rep. of Germany

[21] Appl. No.: 304,153

[22] Filed: Jan. 31, 1989

[30] Foreign Application Priority Data

Feb. 4, 1988 [DE] Fed. Rep. of Germany ....... 3803341

[51] Int. Cl.$^5$ ............................................. B01D 69/02
[52] U.S. Cl. ................................. 210/321.61; 210/450
[58] Field of Search ........... 210/321.61, 321.8, 321.89, 210/450, 321.75

[56] References Cited

U.S. PATENT DOCUMENTS

| | | | |
|---|---|---|---|
| 3,401,798 | 9/1968 | Nyrop | 210/487 X |
| 3,464,562 | 9/1969 | Meyers et al. | 210/321.75 |
| 3,494,470 | 2/1970 | Banfield | 210/321.1 |

*Primary Examiner*—Frank Spear
*Attorney, Agent, or Firm*—Venable, Baetjer, Howard & Civiletti

[57] ABSTRACT

The invention relates to porous membrane filters, specifically mirco- and ultraporous membrane filters, which have fluid-impermeable areas as a result of a change of their structure on one side of the membrane to a film-like state (film-formation). These filters are, for example, very suitable for an assembly in filter cartridges according to the pouring method, because they still have on the side opposite to the filmed-up side a porous structure, which offers an ideal anchoring possibility for penetrating liquid resin.

20 Claims, No Drawings

FLUID-IMPERMEABLE AREAS ON POROUS MEMBRANE FILTERS AND THEIR APPLICATION

BACKGROUND OF THE INVENTION

The invention relates to porous membrane filters, in particular to micro- and ultraporous membrane filters which have fluid-impermeable areas on one side due to a change of the members on that side into a film-like state.

Membrane filters made of a wide variety of thermoplastic materials or polymers are known in the prior art. Thermoplastic materials can include cellulose acetates, polyamides, polyvinylidene fluoride or polysulfone, which have the most varying pore sizes and pore size distributions and can be symmetrical or asymmetrical, as well as hydrophilic or hydrophobic. Typical examples of such membrane filters are described in EP 96 306.

Such membrane filters are frequently brittle, tolerate only very slight mechanical stress, and are sensitive to tearing or tear propagation. As a result, various problems arise in handling, for example, when cutting, stamping, or in the assembly of filter elements such as filter cartridges, plate or pillow modules. When membrane filters are positioned preferably in a pleated manner in filter cartridge housings, the positioning is accomplished by embedding in cold or heat curing multi-component resins or by embedding in melts of synthetic thermoplastics and then solidifyinq the sealing material. In this process, changes can occur in the physical properties of the membrane filter within and immediately outside the fixing area. For example, previously hydrophobic membrane filters can become hydrophilic, such as in the case of the surfactant effect of adsorbed low-molecular resin components. Also, previously hydrophilic membrane filters can become hydrophobic, such as when coating the hydrophilic surface of the membrane filters with absorbed low-molecular resin components and/or when surfactants are desorbed under the influence of temperature, wherein a change in the crystalline portion of partially crystalline polymers and other morphological changes due to the influence of temperature can also play a role. These problems that particularly arise during the manufacture of filter cartridges are described in detail in the aforementioned EP 96 306. This application discusses the problem that arises in the manufacture of cartridges when hydrophilic membrane filters, such as nylon membrane filters, are embedded into polypropylene melts. The problem is that the membrane filters are made hydrophobic beyond the embedding area into an edge zone, whereby this edge zone that is non-wettable with water contains a great number of pores that are a bypass for air in the bubble area test or pressure holding test (integrity test) of the filter cartridge. The air permeability makes the testability of the filter cartridge impossible.

To solve in particular the latter problem, costly processes exist in the prior art that can reduce significantly the porosity of membrane filters at specific desired areas and/or avoid a transition from hydrophilic to hydrophobic, or vice versa.

Thus, for example, US 3,407,252 describes a membrane filter in which the edge area is covered by applying a strip made of a hot-sealable, cross-linkable epoxide resin (hot-setting adhesive).

Furthermore, it has been known to cover the edge of a polyvinylidene fluoride membrane that is to be pleated and built into a filtration module with a polypropylene film which is pressed by mechanical means on the membrane. In the process, the polypropylene film and/or the membrane filter are in a swollen state due to the solvent, and the solvent has to then be removed by means of evaporation.

The aforementioned EP 96 306 describes the sealing of the edge of hydrophilic membrane filters, such as nylon filters, by means of a heat-sealable polyester film, which on the one side has a solvent-free polyethylene surface coating as a hot-setting adhesive.

Furthermore, a process for reducing the edge porosity of membrane filters is proposed in this application. In the process, a casting solution with different components, such as nylon solutions, is poured to obtain a filter that, in addition to the porous filter areas, has edge strips of less porosity.

EP 96 306 also describes the reduction of porosity at the edge strips of the membrane filters in which two superimposed filter webs are mechanically molded whereby the micro- or ultraporous filter matrix collapses over the entire filter thickness.

In addition to the "heat-seal" and the mechanical process, EP 00 36 315 also mentions a process in which the sensitive area of the porous filters is treated by coating with glue adhesive.

Despite the fact that the above described, known processes are very costly (with the exception of the process in which a fluid-impermeable film is applied to one side of the membrane filter), it is not possible to produce on one side of a filter a fluid-impermeable structure and still retain on the opposite side a porous structure. Such a structure is desired, for example, when in the process of embedding the membrane filter into a melt, said melt is to penetrate the porous structure, thereby creating an ideal anchorage possibility.

Of course, the known process of pressing a fluid-impermeable material on a membrane filter offers the possibility of making, on the one hand, the membrane filter fluid-impermeable at one desired area and, on the other hand, making available on the opposite side a porous structure. However, this process, like most of the other above-described processes, necessitates that an outside material be introduced into the membrane filter or applied on the membrane filter, which, in many cases is undesired.

Therefore, the technical problem on which the invention is based is to provide porous membrane filters that are made fluid-impermeable at desired areas in a simple manner without introducing or applying outside materials, but still maintain at those areas opposite the fluid-impermeable areas the filter's porous membrane structure.

SUMMARY OF THE INVENTION

The problem is solved by the porous membrane filters of the invention, which are in particular micro-and ultraporous membrane filters, wherein due to a change in their structure on one side of the membrane into a film-like state, the membranes develop fluid-impermeable areas.

Due to these fluid-impermeable areas on one side, the membrane filters of the invention are ideally suited for assembly in, for example, filter cartridges according to the pouring method. The filters are especially suitable since on one side they still have a porous structure that offers an ideal anchorage possibility for penetrating liquid resin. Another significant advantage of the membrane filters of the invention is that the fluid-impermeable areas can be produced without introducing any outside materials so that they are chemically uniform filters.

DETAILED DESCRIPTION OF THE INVENTION

The fluid-impermeable areas, i.e., the areas that are convectively impermeable with respect to gases and liquid, are preferably continuous or discontinuous along the edge sections of the membrane filters. However, due to the simplicity of their production, they can also be produced at any other arbitrary area and in any arbitrary configuration.

The fluid-impermeable areas on one side of the porous membrane filter of the invention are created by a process termed herein to be film-formation. In this process, the membrane structure on one side of the membrane is first converted to a liquid state in which the material of the membrane filter runs off, i.e., the material becomes a liquid over the entire desired area of the membrane filter such that the pores are thereby closed and then the run off material is set or hardened. By means of this process, the porous structure disappears on one side of the membrane filters of the invention to a desired depth of the membrane, whereby the membrane at the area formed into a film is fluid-impermeable, yet on the opposite side of this area the membrane retains its porous structure.

The liquid state of the membrane material on one side of the membrane filters can be produced according to the invention by selectively reacting the vapor of a solvent or a solvent mixture for the material, e.g., the polymer of the membrane filter with the membrane at the area to be formed into a film on one side of the membrane filter, such that the material of the membrane filter is dissolved down to the desired depth. Following the running off, the film is set by means of cooling and the retained solvent is removed preferably by evaporation and/or washing.

The solvating procedure can be metered by adding a non-solvent for the membrane material in the vapor state to the vapor of the solvent for the material of the membrane filter. Similarly to the solvent, the non-solvent condenses upon contact with the one side of the membrane and has a reduced solvating effect on the material of the membrane filter. It is especially advantageous to use an azeotropic mixture of solvent and non-solvent to generate vapor because then the composition of the mixture in the vapor generator remains constant.

The film-formation process using the effect of solvent vapor or a mixture of solvent vapor and non-solvent vapor is preferably carried out continuously. For example, a web of the membrane filter is guided past an opening through which a targeted stream of a solvent and, if desired, non-solvent vapor, is focused on the section to be formed into a film on the membrane filter. This process is conducted under appropriate conditions with respect to the distance of the jet aimed at the membrane filter, the temperature and concentration of the solvent vapor or non-solvent vapor and the duration of exposure such that the material of the filter membrane is dissolved down to the desired depth and runs off. Then the solvent and, if desired, the non-solvent that is contained in the film thus formed is removed, for example, either by means of blowing a preferably heated stream of gas, in particular a stream of air, or by washing. In this manner a defect-free, i.e., hole-free, complete layer of film is generated on one side of the membrane filter, which is fluid-impermeable. As a result of the high matrix porosity of membrane filters at the area formed into a film, the thickness of the membrane filter sheet decreases.

Especially in the case of membrane filters that are brittle, very sensitive to mechanical stress or tearing or tear propagation, those areas of the membrane filters of the invention that are made into a film have increased strength. Therefore, the filters are preferably cut or stamped or otherwise mechanically processed at these areas, or the filters at these areas are subject to mechanical stresses. In particular, as stated above, the membrane filters of the invention can be used to great advantage in the manufacture of filter cartridges.

Suitable solvents or non-solvents are those substances that are known to be a good solvent or non-solvent for the respective added membrane filter material or polymer. In the case of nylon membrane filters, for example, hot vapors of formic acid or nitric acid can be used as solvent vapors.

Another possibility for film formation is to have a jet of a gas, having a temperature above the softening or melting temperature of the membrane filter material and dimensions corresponding to the area to be formed into a film, act on one side of the membrane filter. In this case, a continuous process is possible in which the speed at which the membrane filter sheet travels past the nozzle through which the gas jet exits, the distance of the exit opening of the nozzle to the surface of the membrane filter, the temperature of the gas jet, and the speed of the gas stream are chosen depending on the desired depth of film formation.

Preferably the depth of the film formation is controlled by the fact that the side of the membrane filter sheet opposite the action of the gas stream makes contact with the heat-conducting foundation, since in this manner a temperature gradient that controls the depth of the film formation can be adjusted.

Preferably the hot gas stream is focused at an angle ranging from 45° to 135° on the membrane filter surface and flows out of a slot nozzle, whose width corresponds to the dimensions of the film-forming section to be produced.

In order to avoid a pleat formation in the material to be treated in the area of the gas stream resulting in the uncontrolled melting of the filter web, it is expedient to hold the membrane filter sheet under a high tensile stress of, for example, 20 N/m, which in a continuous process is brought about by a corresponding adjustment of the rotational speed of the tension roll, whereas in a discontinuous process the membrane is clamped, for example, in a clamping frame. This effect arising from tensile stress can also be helpful in the aforementioned variation using the effect of a solvent vapor. Fixation can also occur in such a manner that the heat-conducting material, which makes contact with the reverse side of the membrane filter sheet, has a great number of small holes to which subpressure is applied, thus causing the membrane filter sheet to be fixed.

Preferably the gas that is used comprises air; however, in the case of oxygen-sensitive materials it can comprise an inert gas such as nitrogen, argon, and the like. However, for most thermoplastic materials of which the membrane filter of the invention is made, air is suitable.

In most cases, film-formation by means of blowing a hot gas onto the membrane is preferred over the method of blowing a solvent vapor onto the membrane, since no measures are required to remove the added solvent and also no environmental problems concerning work safety arise.

The following examples illustrate the present invention only, and are not intended to limit the scope of the invention in any manner.

EXAMPLE 1

Film Formation with Formic Acid Vapors 4 kg of 77.5% formic acid is heated to boiling in a 6 liter flat ground round-bottomed flask (middle neck - flat ground cover) in a 1 kW heating hood with 0.6 kW power handling capacity. Like the boiling solution, the vapor mixture of water and acid comprises 77.5% formic acid and 22.5% water (azeotropic composition). The vapor mixture that escapes is led through a two-neck headpiece (NS 29) with parallel necks spaced 220 mm apart. Two blocks, manufactured of PTFE (120 x 60 x 25 mm, length x width x height), with a 5 mm deep vapor chamber that is open in the rear in the direction of travel of the filter web and whose dimensions are 110 x 40 x 5 mm are mounted on the openings of the two-neck headpiece as bearing surfaces for the porous film to be treated.

A 320 mm wide web of a fleece-reinforced microporous polyamide membrane (rated pore diameter 0.2 μm) is guided directly over the two-armed test set-up at a web speed of 1200 mm/min and a web tension of 20 N/m.

In order to remove the formic acid contained in the two strips whose one side has formed a film, the membrane web is guided through aqueous rinse bath and then wound by means of a drying drum.

In order to manufacture a filter cartridge the pleated web of the material is cut to the required width in such a manner that both cut areas are approximately in the middle of the strips that have formed a film. Extruded polypropylene is used as a sealing compound for the end caps. For comparison purposes, a cartridge is made of a filter material that has not formed a film in the same manner. Table I lists the integrity data of the water-wetted filter cartridges.

TABLE I

|  | Cartridge A (Reference Example) | Cartridge B (Example 1) |
| --- | --- | --- |
| Air Difference (ml/min) (Pressure Holding Test) at Δp = 2.5 bar) | >50 | 17 |
| Bubble-Area (bar) | 3.7 | 3.7 |
| Film Thickness (μm) (SEM-Evaluation/ Scanning Electron Microscope) | — | 10 |

The measured integrity values used for comparison purposes in Table I show that by forming a film on the edge of the filter material to be embedded in PP, a minimum three-fold lower air diffusion value is attained.

EXAMPLE 2

Film Formation With Hot Gas

A 320 mm wide web of a non-reinforced micro-porous polyamide membrane (rated pore diameter of 0.45 μm) is guided around a stainless steel drum with a diameter of 50 mm (5 mm jacket thickness, not cooled, at room temperature) at a web speed of 1500 mm/min and a web tension of 20 N/m in such a manner that the incline of looping around the roll is 150°.

A hot-air device that is mounted vibration proof (Leister Corporation, Triac model), is placed in front of the traveling web in such a manner that the distance between the mounted slot die (20 x 1 mm) and the surface of the micro-porous web is 1.5 mm. The 320° hot air stream (3.2 thermostat setting) strikes at a 90° angle the surface of the filter looping around the stainless steel drum. The thickness of the strip obtained through film formation is measured at 10–13 μm in the SEM.

The one-sided filmed filter web (one strip) is used without any further treatment for the following test to determine the tear propagation resistance on a tensile testing machine from the Adamel-Lhomargy Corporation, Model 21B.

Samples (60 x 150 mm) are cut from the treated filter web in such a manner that the filmed 20 mm wide strip is bounded by 30 or 100 mm of non-treated material. Seven (test 1) or 17 (test 2) samples are superimposed -- film on film -- and the sample package is cut in the center 80 mm from the top, fixed in the micrograph of the measuring device and the tear propagation resistance is determined. The results are shown in Table II.

TABLE II

| Test Number | Number of Filters Superimposed | Tear Strength (daN) | |
| --- | --- | --- | --- |
| | | Non Treated | Filmed |
| 1 | 17 | 0.08 | 0.36 |
| 2 | 7 | 0.04 | 0.20 |

The results in Table II show that the tear propagation resistance in the area having formed a film is increased by a factor of 4.5 to 5.

While the invention has been disclosed in this patent application by reference to the details of preferred embodiments of the invention, it is to be understood that the disclosure is intended in an illustrative rather than in a limiting sense, as it is contemplated that modifications will readily occur to those skilled in the art, within the spirit of the invention and the scope of the appended claims.

What is claimed is:

1. A porous membrane filter comprising: at least one fluid-impermeable area on at least one of a first side, a second side or any edge, said filter being chemically uniform, said fluid-impermeable areas are produced by means of film formation of the membrane material on one side of the membrane, said film formation comprises (a) converting the membrane material on one side of the membrane to a liquid state, (b) sealing the pores with the liquid membrane material, and (c) setting the liquid membrane material to form a film.

2. The porous membrane filter of claim 1, wherein said liquid state of the membrane material on one side of the membrane is produced by reacting a vapor of a solvent or a solvent mixture with the membrane material to form a solution of said membrane material.

3. The porous membrane filter of claim 2, wherein a vapor of a non-solvent is mixed with the vapor of said solvent or solvent mixture.

4. The porous membrane filter of claim 3, wherein the composition of the vapor mixture corresponds to that of the azeotrope of the two components.

5. The porous membrane filter of claim 1, wherein said liquid state of the membrane material is produced by contacting a hot gas with the membrane material to form a melt of the membrane material.

6. The porous membrane filter of claim 5, wherein the temperature of the hot gas is greater than the melting point of the membrane material.

7. The porous membrane filter of claim 5, wherein the membrane side opposite the side upon which the hot gas is acting is kept in contact with a heat conducting material.

8. The porous membrane filter of claim 5, wherein the membrane side opposite the side upon which the hot gas is acting is kept at a temperature below the melting point of the membrane material.

9. A filter element which comprises the porous membrane filter of claim 1.

10. The filter element of claim 9 wherein said filter element is a filter cartridge.

11. The filter of claim 1 wherein said one or more areas that are fluid imperable have a film-like state.

12. The porous membrane filter of claim 1 wherein said first side is fluid-permeable; and said second side has at least one area that is fluid-permeable and at least one area that is fluid-impermeable.

13. The porous membrane filter of claim 1 wherein any edge has at least one fluid-impermeable area.

14. A filter element which comprises the porous membrane filter of claim 13.

15. The filter element of claim 14 wherein said filter element is a filter cartridge.

16. The porous membrane filter of claim 1 wherein the at least one fluid-impermeable area is on one side of the membrane and the at least one fluid-permeable area is opposite the at least one fluid-impermeable area on the other side of the membrane.

17. A filter element which comprises the porous membrane filter of claim 16.

18. The filter element of claim 17 wherein said filter element is a filter cartridge.

19. A method of producing a fluid-impermeable area on a chemically uniform porous membrane filter, comprising: (a) converting the membrane material on one side of the membrane to a liquid state, (b) sealing the pores with the liquid membrane material, and (c) setting the liquid membrane material to form a film.

20. A method of producing a chemically uniform porous membrane filter having at least one fluid-impermeable area, comprising: (a) converting the membrane material on one side of the membrane to a liquid state; (b) sealing the pores with the liquid membrane material; and (c) setting the liquid membrane material to form a film.

* * * * *